United States Patent [19]

Hager

[11] Patent Number: 4,763,534

[45] Date of Patent: Aug. 16, 1988

[54] PRESSURE SENSING DEVICE

[75] Inventor: Robert J. Hager, Phoenix, Ariz.

[73] Assignee: Robert G. Fulks, Bedford, Mass.

[21] Appl. No.: 696,695

[22] Filed: Jan. 31, 1985

[51] Int. Cl.$^4$ .......................... G01L 1/18; H01C 10/12
[52] U.S. Cl. .................................. 73/862.68; 338/99;
338/114
[58] Field of Search ..................... 73/862.01, 862.68;
338/47, 99, 100, 114; 340/365 A

[56] References Cited

U.S. PATENT DOCUMENTS

| 3,503,031 | 3/1970 | Nyhus et al. | 340/365 A X |
|---|---|---|---|
| 4,014,217 | 3/1977 | Lagasse et al. | 73/432 R |
| 4,575,601 | 3/1986 | Taguchi et al. | 340/365 A X |

Primary Examiner—Charles A. Ruehl
Attorney, Agent, or Firm—Harry M. Weiss

[57] ABSTRACT

A pressure sensing device utilizing force transducer ink comprises a resistive region deposited between a first and a second conducting region on a first insulating material, the resistive region electrically coupling the two conducting regions. On a second insulating material, a conducting region is deposited and a layer of force transducer ink is deposited over the conducting region. The two insulating materials are positioned in such a manner that the pressure transducer ink is in contact with the resistive region and separates the resistive and coupled conducting regions from the conducting region. A determination of the force applied to this configuration can be made by measuring the resistance between the first and second conducting regions. According to a second embodiment, a second resistive region and coupled conducting regions replace the conducting region on the second insulating material. By orienting the two resistive conducting element configuration, a position of a force applied to the pressure sensing device can be determined as well as the strength of the force.

6 Claims, 1 Drawing Sheet

U.S. Patent   Aug. 16, 1988   4,763,534
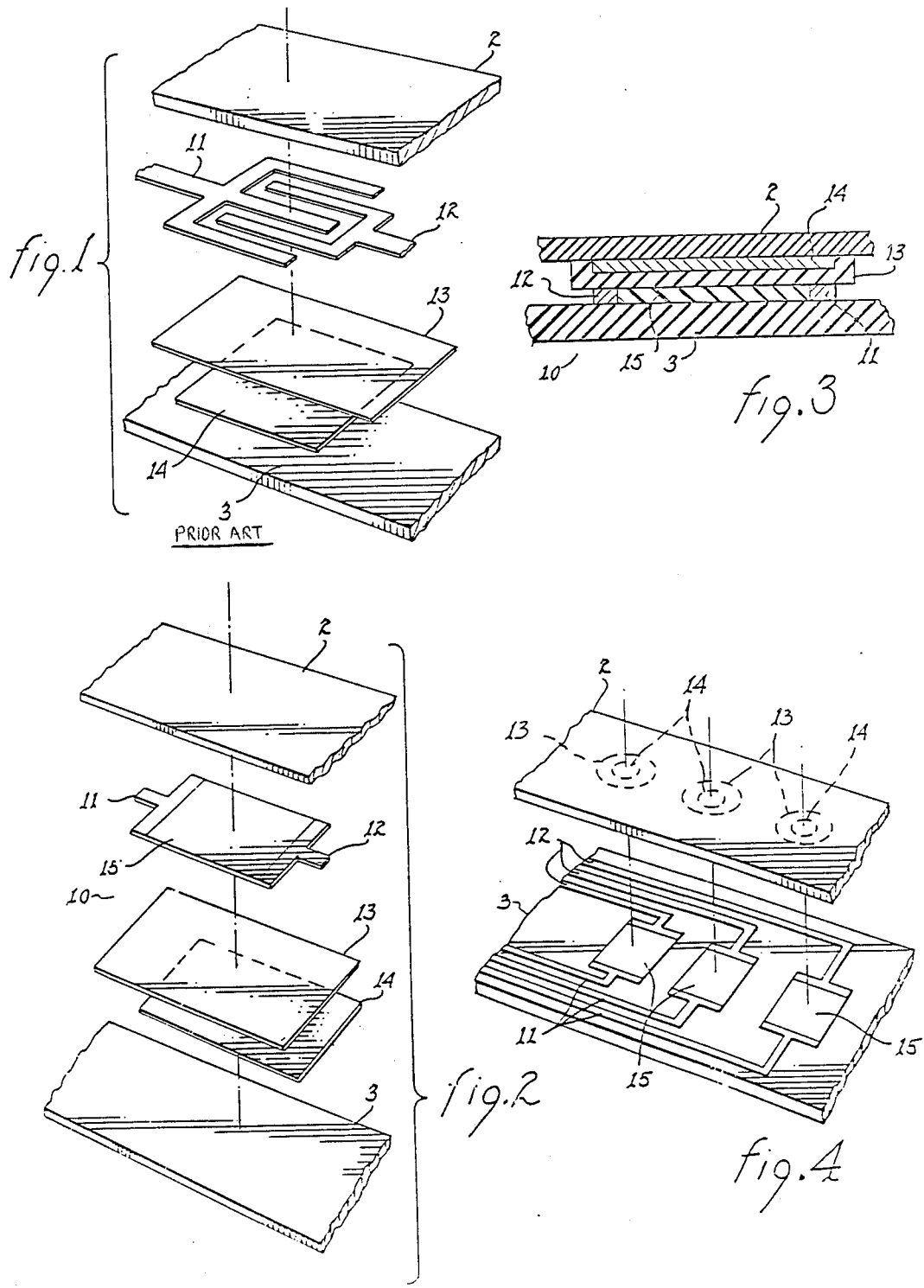

PRESSURE SENSING DEVICE

BACKGROUND OF THE INVENTION

1. Field of the Invention

This invention relates generally to pressure sensing devices and, more particularly, to pressure sensing devices employing force transducer ink.

2. Discussion of the Related Art

Recently, a force transducer ink has been developed that, upon the application of pressure to a layer of the material, results in a dramatic change in resistance of the layer. This material has been utilized in a variety of configurations for detecting the application of pressure. In particular, a typical pressure sensing device 10 is shown in FIG. 1. This device includes a first conducting pattern 11 and a second conducting pattern 12 deposited on an insulating material 2. The conducting patterns are separated so that a very large resistance, essentially an open circuit value, is measured between terminals coupled to the two patterns. On a second sheet of insulating material 3, a conducting pattern 14 is deposited and a layer of the force transducer ink is then applied over the conducting pattern. The two insulating materials are then positioned in so that the pressure sensing ink 13 separates the conducting patterns 11 and 12 from the conducting pattern 14. When a pressure is applied to this configuration, a path is formed from the conducting pattern 11 through the force transducer ink 13 to the conducting region 14 and then back though the force transducer ink to the second conducting pattern 12. Thus, application of a force to the configuration can be measured by a change in resistance as measured by a change in resistance as measured between conducting pattern 11 and conducting pattern 12.

Although this pressure sensing configuration can detect application of pressure, a need has been felt for a pressure sensing device that, in addition to determining the presences of a pressure, can provide a quantitive measure of the pressure applied to the configuration.

SUMMARY OF THE INVENTION

It is therefore an object of the present invention to provide an improved pressure sensing device.

It is a further object of the present invention to provide a pressure sensing device in which a quantitive measure of the applied force can be obtained.

It is yet another object of the present invention to provide a pressure sensing device with deposited components having a pattern configuration that is not critical with respect to component position and can be easily replicated.

It is yet another object of the present invention to provide apparatus and method for determination of a position of force applied to a pressure sensing device.

The aforementioned and other objects are accomplished, according to the present invention, by depositing, on a first insulating material, a resistive region formed between conducting patterns, the conducting patterns serving as electrodes for coupling the resistance region to external circuits. On a second insulating material, a conducting region is first deposited and then a layer of pressure transducer ink is deposited over the conducting region. The two insulating sheets are thereafter positioned so that the pressure transducer ink layer separates the conducting region on the second insulating material from the resistive region and the conducting electrodes on the first insulating material. By utilizing this pressure sensing configuration, a quantitive measure of a force applied to the configuration can be obtained. According to another embodiment of the present invention, the second insulating material has deposited thereon a resistive region with conducting regions coupled thereto and a layer of force transducer ink deposited over resistive region and conducting regions. The current flowing between the conducting regions and through the resistive regions are generally at 90 degrees with one another when the pressure sensing device is assembled. By measuring parameters of the pressure sensing configuration, a location of applied force can be determined.

These and other features of the invention will be understood upon reading of the following description along with the drawings.

BRIEF DESCRIPTION OF THE DRAWINGS

FIG. 1 is an exploded view of an Prior Art pressure sensing device utilizing the force transducer ink.

FIG. 2 is an exploded view of a pressure sensing device according to the present invention.

FIG. 3 is a cross-section view of the pressure sensing device of the present invention.

FIG. 4 illustrates an implementation utilizing a multiplicity of pressure sensing elements according to the present invention.

FIG. 5 is an exploded view of a second embodiment of the pressure sensing device of the present invention.

FIG. 6 is a schematic view of the equivalent electrical circuit of the second embodiment of the pressure sensing device when a force is applied thereto.

FIG. 7a, FIG. 7b and FIG. 7c illustrate how parameters of the equivalent electrical circuit of the second embodiment of the present invention can be determined.

DESCRIPTION OF THE PREFERRED EMBODIMENT

Description of the Drawings

Referring to FIG. 1, this Prior Art pressure sensing device has been discussed previously. The change in resistance resulting from a force being applied to this type of pressure sensing device has found a multiplicity of applications, e.g. inexpensive keyboards, where the identification of the assertion of the force provides sufficient information.

Referring next to FIG. 2, an exploded view of one embodiment of a pressure sensing device of the present invention is shown. a first conductor region or electrodee 11 and a second conducting region or electrode 12 are deposited on an insulating material and are separated by a deposited resistive region 15 that has a resistance value in a pre-established range. On a second insulating material 3, a conducting region 14 is deposited and a layer of the force transducer ink 13 is deposited over the conducting region. The two insulating materials are then positioned so that the layer of force transducer ink 13 separates the resistive region 15 from the conducting region 14. The insulating materials upon which the conducting regions and the resistive regions are deposited can be flexiblee plastic sheets or other material suitable for use in applications requiring a pressure sensing device.

Referring next to FIG. 3, a cross-section view of the pressure sensing device of the present invention is shown. The pressure sensing device 10 is contained between insulating material 2 and insulating material 3. The pressure sensing device 10 includes an electrode 11 and an electrode 12 with a resistive region 15 electrically coupling the two electrodes. A conducting area 14 is deposited on the inner surface of insulating material 2, while a layer of force transducer ink 13 separates the conducting region 14 from both the conducting electrodes 11 and 12 and resistive region 15.

Referring to FIG. 4, two insulating materials 2 and 3 are shown. Deposited in an interior side of insulating material 2 are a multiplicity of conducting regions 14 and, deposited thereon, a multiplicity of layers or regions 13 formed by the force transducer ink. Deposited on insulating material 3 are a plurality of resistive region 15 and coupled to the resistive region are deposited conducting regions 11 and 12, the conducting region acting as electrodes or terminals across each resistive region. When the two insulating materials are brought into contact, a multiplicity of pressure sensing elements can be formed with the conducting region serving as electrodes for electrically coupling the resistive regions to exterior circuits.

Referring now to FIG. 5, an exploded view of a second embodiment of a pressure sensing device of the present invention is shown. A first resistive region 15' is coupled to electrodes 11' and 12'. A second resistive region 15" is coupled to electrodes 11" and 12". Separating the two resistive regions and associated electrodes is a layer of force transducer ink 13. The arrow 20 indicates that a localized force is applied to the resistive regions. The electrodes for the resistive regions are generally arranged to provide current flowing at 90 degrees to the other current when voltage is applied to the electrodes. Not shown in this figure are the insulating materials providing a package and/or support for the deposited components of the pressure transducer device.

Referring next to FIG. 6, an equivalent circuit diagram is shown for the pressure sensing device of FIG. 5. The resistance between electrode 11' and electrode 12' is given as $R_1$. The resistance between electrodes 11" and 12" is given as $R_2$. When a localized force 20 is applied to the pressure sensing device, a resistance $R_3$ is developed between resistive region 15' and region 15". The resistance between developed resistance $R_3$ and conducting region 11' is a $R_1$, while the resistance between developed resistance $R_3$ and conducting region 12" is $(1-a)R_1$. Similarly, the resistance between developed resistance $R_3$ and conducting region 11" is given by $bR_2$, while the resistance between developed resistor $R_3$ and conducting region 12" is given by $(1-b) R_2$.

Referring now to FIGS. 7a, 7b and 7c, the procedure by which the parameters a, b and $R_3$ can be determined in terms of the schematic equivalent circuit diagram of FIG. 6 is shown. In FIG. 7(a), when a voltage source 72 is placed between terminals 11' and 12', and a high input impedance voltmeter 71 is coupled to either of the terminals of resistance $R_1$, i.e, either terminal 11' or 12', and the terminal of resistive element $R_2$ is coupled to the negative terminal of voltage source 72, then the parameter a [and consequently $(1-a)$] can be determined by the ratio of the measured voltage to the value of the voltage source. Similarly, the parameter b [and consequently $(1-b)$] can be determined by applied voltage source 72 across terminals 11" and 12"and measuring the voltage at either terminal 11' or 12' with high impedance voltmeter 71, voltmeter 71 also being coupled to the negative terminal of voltage source 72. The ratio of the voltage measured by the voltmeter to the voltage of the voltage source provides the parameter b. By applying voltage source 72 through current meter to either terminal 11' or 12' and to either terminal 11" or terminals 12", then a current can be measured by current meter 73, the current flowing through a portion of resistance $R_1$, a portion of resistance $R_2$ and through resistance $R_3$. When resistance $R_3$ is much greater than either resistance $R_1$ or resistance $R_2$, as can be accomplished by appropriate choice of composition of the resistive elements, then the voltage divided by the current will provide value of resistance $R_3$.

Operation of the Preferred Embodiment

When a pressure sensing device is configured as shown in FIG. 2, then a value of resistance determined by the geometry and composition of the restrictive layer 15 can be measured between electrode 12 and electrode 11. When however, a pressure is applied to the configuration, a change in the resistance measurement between electrode 11 and electrode 12 is found, resulting from the path(s) formed in the force transducer-ink region from the resistive region to the conducting region. Not only is the change is resistance found, but it is also observed that as the pressure is increased, that a continuing change (i.e. lowering) of resistance measured between the conducting regions coupled to the resistance region can be observed. As an example of the possible dimensions of such a pressure sensing region, area 15 can typically have dimensions of one centimeter on a side. The normal resistance value of resistive region between conducting regions can typically be of the order of thirty thousand ohms. When pressure is applied, this resistance can be continuously lowered to a value of ten thousand ohms. However, the composition of the resistive region and the force transducer ink can cause wide variations in these parameters.

It will be clear that a multiplicity of electrodes, such as shown in FIG. 3 can be arranged for numerous applications. The complexity of the pressure sensing element array can be limited only by the geometrical configuration of conducting regions for coupling the resistive regions to external circuits.

It will be also clear that a geometry with a second electrode, coupled to the conducting region isolated by the pressure transducer ink, but at a relatively large distance from an electrodes coupled to the resistive region, can show a similar effect.

In order to provide a device for quantitive measurement of force, the force must first be applied generally uniformly to the entire region. And for relatively accurate measurement of pressure, the resistance measured across the resistive electrodes can be calibrated as a function of a known force.

Referring to the pressure transducer of FIG. 5, the determination of the value of a and the value of b, as shown in FIG. 7(a) and FIG. 7(b), can provide an approximate determination of the location of the application of force 20 of FIG. 5. To the extent that the resistive regions are linear, the parameters a and b can directly determine a location of the applied force. It will be clear that for certain geometries of resistive regions and for increased accuracy, the parameter a and the parameter b can be conveniently calibrated by applying force to a known position. In addition, the determination of the position, the value of $R_3$ is related to the strength of the applied force for a given geometry of the instrument applying the force. The measurement to determine the parameters a, b, and $R_3$ can be automated by known techniques so that a real time measurement of a stylus or other instrument moving across the pressure sensing device can identify at any point the particular position and the pressure with which the stylus is applied to the pressure sensing device. This determination has potential application, for example, to a quantitive measurement of a signature.

The above description is included to illustrate the operation of the preferred embodiment and is not intended to limit the scope of the invention. The scope of the invention is to be limited only by the following claims. From the above description, many variations will be apparent to one skilled in the art that would yet be encompassed by the spirit and scope of the present invention.

What is claimed is:

1. A pressure sensing device comprising:
   a first and a second electrode;
   a resistive region electrically coupled to said first and said second electrode;
   a conducting region;
   a layer of force transducer ink separating said conducting region from said resistive region and;
   means for measuring a change in an electrical parameter between said first and second electrodes to determine a value of force, when pressure is applied to said regions.

2. The pressure sensing device of claim 1 wherein said first and said second electrodes and said resistive region are deposited on a first insulating material; and wherein said conducting region and said force transducing ink are deposited on a second insulating material.

3. The method of sensing pressure comprising the steps of:
   depositing a resistive region on insulating material;
   coupling conducting electrodes to said resistive region;
   providing a conducting region overlying said resistive region;
   separating said resistive region from said conducting region by a region of force transducer ink; and
   measuring a change in resistive value between said conducting electrodes when pressure is applied to said regions.

4. The method of sensing pressure of claim 3 further comprising the step of calibrating said change in resistive value with a known force to provide a quantitive measure of applied pressure.

5. A pressure sensing device comprising:
   a first insulating material;
   a second insulating material;
   a conducting layer in contact with an inner surface of said first insulating material;
   a layer of force transducer ink in contact with said conducting layer;
   a resistive element in contact with said force transducer ink layer and said second insulating material, said resistive element having a plurality of conducting regions coupled thereto; and
   means for measuring a change in an electrical parameter between said plurality of conducting regions to provide a value of force when pressure is applied to said layers.

6. The method of measuring a force comprising the steps of:
   measuring a resistive value of a layer of resistive material;
   separating said resistive material from a conducting layer of material by a layer of force transducer ink; and
   measuring a change in resistance of said layer of resistive material when a force is transmitted to said layer of force transducer ink.

* * * * *